(12) United States Patent
Jeoung et al.

(10) Patent No.: US 7,675,600 B2
(45) Date of Patent: Mar. 9, 2010

(54) LIQUID CRYSTAL DISPLAY PANEL AND LIQUID CRYSTAL DISPLAY APPARATUS HAVING THE SAME

(75) Inventors: Hun Jeoung, Gyeongsangbuk-do (KR); Young Hak Lee, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 835 days.

(21) Appl. No.: 11/471,517

(22) Filed: Jun. 21, 2006

(65) Prior Publication Data
US 2007/0046322 A1   Mar. 1, 2007

(30) Foreign Application Priority Data
Aug. 30, 2005   (KR)  ............... 10-2005-0079854

(51) Int. Cl.
G02F 1/1345   (2006.01)
G01R 31/00   (2006.01)
(52) U.S. Cl. ..................... 349/149; 324/770
(58) Field of Classification Search ............ 349/33, 349/42, 149, 151, 152; 345/92; 324/770
See application file for complete search history.

(56) References Cited
U.S. PATENT DOCUMENTS
7,456,647 B2 * 11/2008 Jeon et al. ............... 324/770

2002/0051114 A1   5/2002   Kwak et al.
2004/0095303 A1   5/2004   Moon et al.
2004/0150765 A1   8/2004   Ueda et al.

FOREIGN PATENT DOCUMENTS
JP   2005-221598   8/2005

* cited by examiner

Primary Examiner—Dung Nguyen
Assistant Examiner—Tai Duong
(74) Attorney, Agent, or Firm—McKenna Long & Aldridge

(57) ABSTRACT

Disclosed are a liquid crystal display panel and apparatus, which can prevent electrolytic corrosion or other corrosion of on-off pads in a test pad part. The liquid crystal display panel comprises: a pixel part having a plurality of pixels arranged in a matrix at intersections of a plurality of gate lines and a plurality of data lines; a gate pad part having a plurality of gate pads, each of the gate pads connected with the corresponding gate lines to deliver a gate signal; a data pad part having a plurality of data pads, each of the data pads connected with the corresponding data lines to deliver a data signal; a test pad part having at least one or more on-off pads delivering a test signal to the gate lines or the data lines; and a switching device for cutting off the gate signal and/or the data signal so as not to be provided to the on-off pads upon driving the liquid crystal display panel.

14 Claims, 7 Drawing Sheets

LIQUID CRYSTAL DISPLAY PANEL AND LIQUID CRYSTAL DISPLAY APPARATUS HAVING THE SAME

This application claims the benefit of Korean Patent Application No. 10-2005-0079854, filed on Aug. 30, 2005, which is hereby incorporated by reference for all purposes as if fully set forth herein.

BACKGROUND OF THE INVENTION

1. Field of the Invention

The present invention relates to a liquid crystal display apparatus, and more particularly, to a liquid crystal display panel, which has on-off pads formed on a non-display region of a thin film transistor substrate for testing short circuit characteristics of gate lines or data lines, and a liquid crystal display apparatus having the same.

2. Discussion of the Related Art

A liquid crystal display apparatus may comprise a liquid crystal display panel further comprised of an upper substrate having a color filter, a lower substrate having a thin film transistor array, and a liquid crystal layer formed between said substrates and a driving circuit for supplying a driving signal to the liquid crystal display panel. Thus, the liquid crystal display apparatus may have a structure where an array substrate on which thin film transistors are arranged, and a color filter substrate having red, green and blue sub color filters are attached to each other with liquid crystal sealed between them.

Once the substrates are attached together, they are cut in units of liquid crystal display panels each having a display region and a non-display region. Then, each unit is checked for defects.

Next, a grinding process for grinding an edge of the liquid crystal display panel units is carried out.

In a scribing process and grinding process, a shorting bar for static protection and test signal wiring are cut, and then an assembling process for electrically connecting them to a circuit device such as a gate PCB, data PCB, etc. of the liquid crystal display apparatus is carried out.

Referring to FIG. 1, a liquid crystal display panel having a test pad part will be described in detail.

FIG. 1 is a view showing a related art liquid crystal display panel having a test pad part, in which the related art liquid crystal display panel 100 is divided into display parts 110 and non-display parts 120.

Referring to FIG. 1, when a lower thin film transistor substrate on which pixel electrodes are formed, and an upper color filter substrate on which color filter layers are formed are completed, an attachment process for attaching the thin film transistor substrate and the color filter substrate is performed. Thereafter, a cell process is performed. In the cell process, a first scribing process for cutting the attached substrates in a bar shape along a first scribe line is initially performed.

On the liquid crystal display panel 100, formed by cutting the substrates into a bar shape according to the first scribing process, a plurality of display parts 110 and non-display parts 120 are formed. Especially, in the case of a small-size liquid crystal display apparatus, a large number of display parts 110 and non-display parts 120 exist in the liquid crystal display panel 100 cut according to the first scribing process.

Each of the display parts 110 may be comprised of a pixel part 111 used as an active region, a gate pad part 112, a data pad part 113 and a test circuit part 114. Each of the non-display parts 120 is comprised of a test pad part consisting of a gate test pad 121 and a data test pad 122 and a connection terminal 123.

As described above, once the substrates, separated according to the first scribing process, are cut into a bar shape, a liquid crystal injection process is performed.

When the liquid crystal injection process is finished, a second scribing process for cutting along a second scribe line in units of display parts 110 is performed on the liquid crystal display panel 100 cut into each bar type.

When the second scribing process is performed, the liquid crystal display panel is separated into one unit of liquid crystal display having a display part and a non-display part.

The thus-separated liquid crystal display panel 100 is then subjected to a cell testing process for testing a driving state. A gate driving signal and RGB data signals are applied through test signal wiring 124 and test pads 121 and 122 that are formed on the non-display part 120, to thus test a driving state of the display part 110 in the pixel part 111 used as an active region.

The test signal wiring 124 is electrically connected to the data pad part 113 and the gate pad part 112. When a test signal is applied through the test signal wiring 124, a data signal for testing is applied according to the turn-on or turn-off of the thin film transistor TFT formed in the active region 111 of the display part 110, to check if pixels are defective.

The test pad parts 121 and 122 may be classified as a gate test pad part 121 and a data test pad part 122. Each of the test pad parts 121 and 122 may have a plurality of on-off pads 121a, 121b and 121c formed thereon, and the on-off pads 121a, 121b and 121c are electrically connected to each other.

Once the cell testing process is finished, a grinding process is performed to short-circuit the test signal wiring 124. Thus, part of the test signal wiring 124 is formed substantially adjacent to the first scribe line.

Hence, a grinding part (not shown) for short-circuiting the signal wiring 124 is formed at a region substantially adjacent to the first scribe line and the test signal wiring 124. The test signal wiring 124 is ground along with edges of the substrate according to a grinding operation, thereby short-circuiting part of the test signal wiring 124.

FIG. 2A is a view for explaining the occurrence of electrolytic corrosion or other corrosion of on-off pads in the test pad parts 121 and 122 according to the related art. FIG. 2B is a photograph showing electrolytic corrosion or other corrosion occurring on the on-off pads.

Referring to FIG. 2A, the on-off pads 121a, 121b and 121c in the test pad parts 121 and 122 according to the related art are made of Mo or AlNd or the like. Furthermore, a substantially more negative voltage is applied to one of the on-off pads 121a, 121b and 121c than the neighboring on-off pads upon driving the liquid crystal display panel 100, and a subsequent leakage current may cause electrolytic corrosion.

For instance, in a substrate of a COG (Chip On Glass) type, the driving of the liquid crystal display panel is carried out by a signal applied from a source or gate driving circuit (D-IC) 125. For example, the test pad parts 121 and 122 have such a structure in which a signal 127 applied from the driving circuit 125 must be applied to the on-off pads 121a, 121b and 121c along a signal line 126 connected therebetween.

FIG. 2B is a photograph showing electrolytic corrosion or other corrosion occurring on the on-off pads 121a, for example, in the test pad part 121. A problem results in that unintended gate and data signals are applied to the on-off pads 121a, 121b and 121c thus causing electrolytic corrosion or other corrosion of the on-off pads 121a, 121b and 121c.

SUMMARY OF THE INVENTION

Accordingly, the present invention is directed to a liquid crystal display panel and liquid crystal display apparatus having the same that substantially obviates one or more of the problems due to limitations and disadvantages of the related art.

An advantage of the present invention is to provide a liquid crystal display which prevents electrolytic corrosion or other corrosion of on-off pads substantially formed on a non-display region of a liquid crystal display panel.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, there is provided a liquid crystal display panel comprising: a pixel part having a plurality of pixels arranged in a matrix at intersection areas of a plurality of gate lines and a plurality of data lines; a gate pad part having a plurality of gate pads, each of the gate pads connected with the corresponding gate lines to deliver a data signal; a data pad part having a plurality of data pads, each of the data pads connected with the corresponding data lines to deliver a data signal; a test pad part having at least one or more on-off pads delivering a test signal to the gate lines or the data lines; and a switching device for cutting off the gate signal and/or the data signal so as not to be provided to the on-off pads upon driving the liquid crystal display panel.

The switching device may be formed on a test line connected to the at least one or more on-off pads.

The switching of the switching device connected to the at least one or more on-off pads may be controlled by a single control signal.

The switching of the switching device connected to the at least one or more on-off pads may be controlled by corresponding control signals.

The switching device may allow a gate test signal or a data test signal input through the on-off pads to pass through at the time of an on/off test of the liquid crystal display panel.

The switching device may be constructed of a thin film transistor.

The test pad part may further comprise a gate test pad part for delivering a gate test signal to the gate lines and a data test pad part for delivering a data test signal to the data lines, and the switching device is formed substantially between gate and data driving circuits for providing a gate signal and a data signal to the corresponding gate and data pad parts and the gate and data test pad parts, respectively.

In another aspect of the present invention, there is provided a liquid crystal display apparatus comprising: a source driver for applying a data signal to data lines; a gate driver for applying a gate signal to gate lines; and a liquid crystal display panel for displaying data through unit pixels in response to the gate signal and the data signal, wherein the liquid crystal display panel further comprises: a pixel part having a plurality of pixels arranged in a matrix at intersection areas of a plurality of gate lines and a plurality of data lines; a gate pad part having a plurality of gate pads, each of the gate pads connected with the corresponding gate lines to deliver a data signal; a data pad part having a plurality of data pads, each of the data pads connected with the corresponding data lines to deliver a data signal; a test pad part having at least one or more on-off pads delivering a test signal to the gate lines or the data lines; and a switching device for cutting off the gate signal and/or the data signal so as not to be provided to the on-off pads upon driving the liquid crystal display panel.

In another aspect of the present invention, there is provided a liquid crystal display apparatus comprising: a pixel part having a plurality of pixels arranged in a matrix at intersection areas of a plurality of gate lines and a plurality of data lines; a gate pad part having a plurality of gate pads, each of the gate pads connected with the corresponding gate lines to deliver a gate signal; a data pad part having a plurality of data pads, each of the data pads connected with the corresponding data lines to deliver a data signal; a test pad part having at least one or more on-off pads delivering a test signal to the gate lines or the data lines; and a driving circuit part for applying the gate signal, the data signal and the test signal to the gate pad part or the data pad part and applying a compensation signal for compensating the gate signal and/or the data signal introduced to the on-off pads to the on-off pads in the test pad part to the on-off pad of the test pad part.

The test pad part may further comprise a gate test pad part for delivering a gate test signal to the gate lines and a data test pad part for delivering a data test signal to the data lines, and the driving circuit part may further comprise a gate driving circuit for providing the gate signal and the gate test signal and a data driving circuit for providing the data signal and the data test signal, the data driving circuit applying the compensation signal to at least one of the on-off pads in the data test pad part.

The liquid crystal display apparatus may further comprise: a first switch for applying or cutting off the compensation signal to or from the data test pad under control by the data driving circuit; and a second switch for preventing the gate signal and/or the data signal from being introduced to the gate test pad and/or the data test pad.

The first switch or the second switch may be substantially formed substantially between the data driving circuit and the on-off pads in the data test pad part. The first switch or the second switch may be a thin film transistor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

In the drawings.

DETAILED DESCRIPTION OF THE ILLUSTRATED EMBODIMENTS

Figure 1:
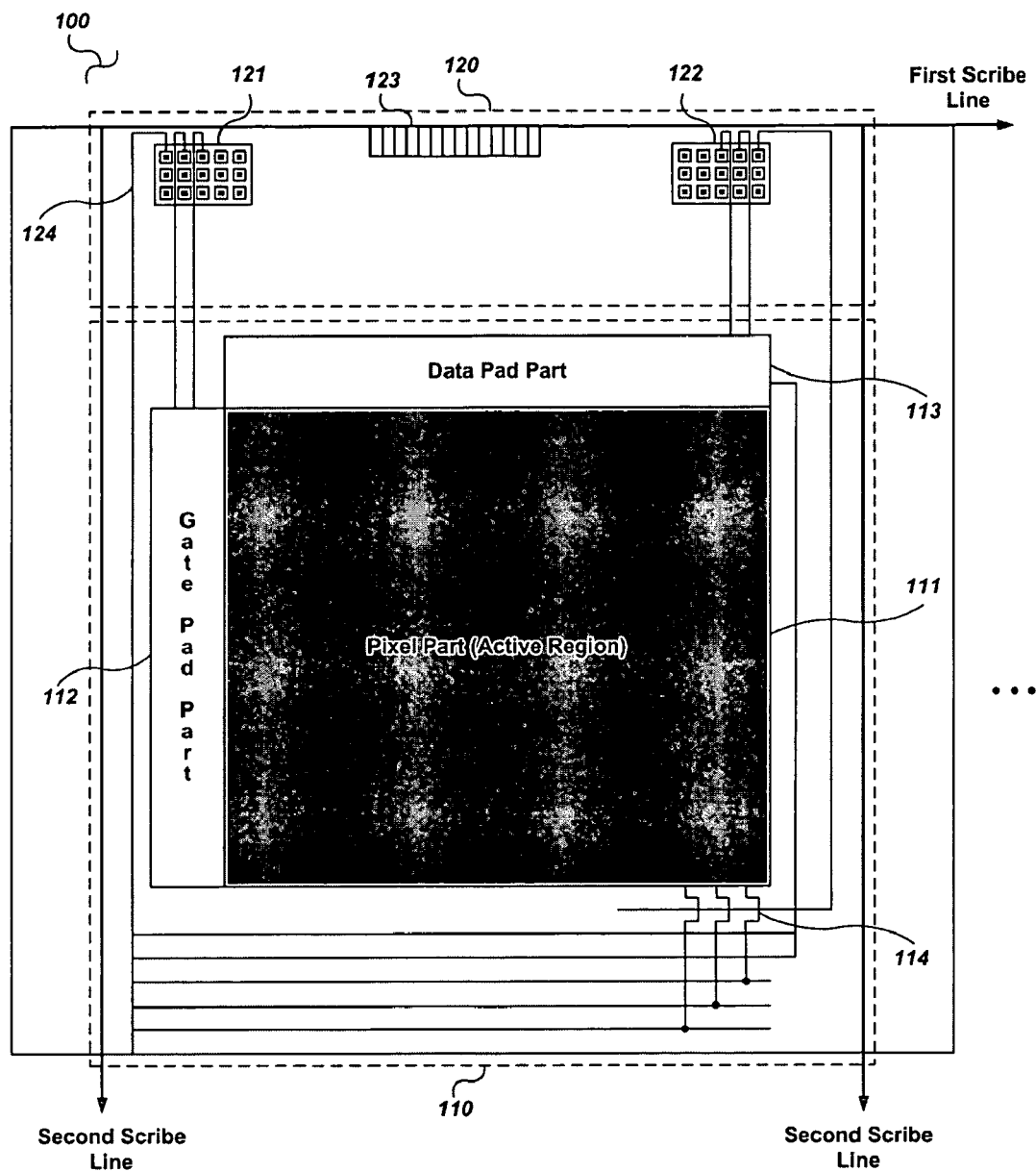
FIG. 1 is a view showing a related art liquid crystal display panel having a test pad part.
Figure 2A:
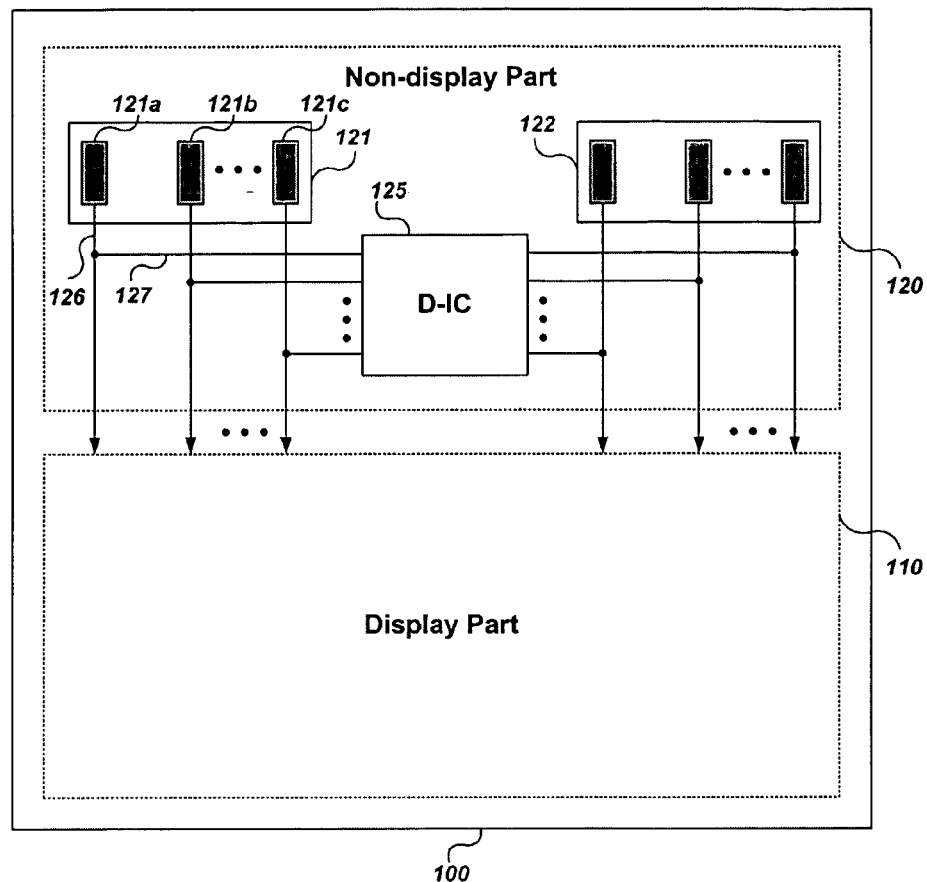
FIG. 2A is a view for explaining the occurrence of electrolytic corrosion or other corrosion of on-off pads in the test pad parts according to the related art.
Figure 2B:
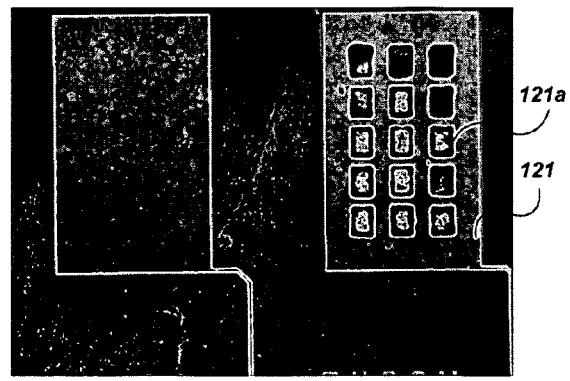
FIG. 2B is a photograph showing electrolytic corrosion or other corrosion occurring on the on-off pads.

Reference will now be made in detail to an embodiment of the present invention, example of which is illustrated in the accompanying drawings. Therefore, the below-described embodiments are provided to make those skilled in the art to fully understand the scope of the present invention, and it should be noted that the forgoing embodiments are merely illustrative in all aspects and are not to be construed as limiting the invention. Like reference numerals are employed to designate like parts throughout the specification.

Hereinafter, a liquid crystal display panel and a liquid display apparatus having the same in accordance with embodiments of the present invention will be described in detail with reference to the accompanying drawings.

Initially, although a test pad part in accordance with an embodiment of the present invention may be formed on a thin film transistor substrate, a test process is carried out on a completed liquid crystal display panel to include both the array and color filter substrate with liquid crystal in between and hence the thin film transistor substrate is considered a complete liquid crystal display panel even though FIGS. 3 to 7 do not illustrate a color filter substrate and a liquid crystal layer.

Figure 3:
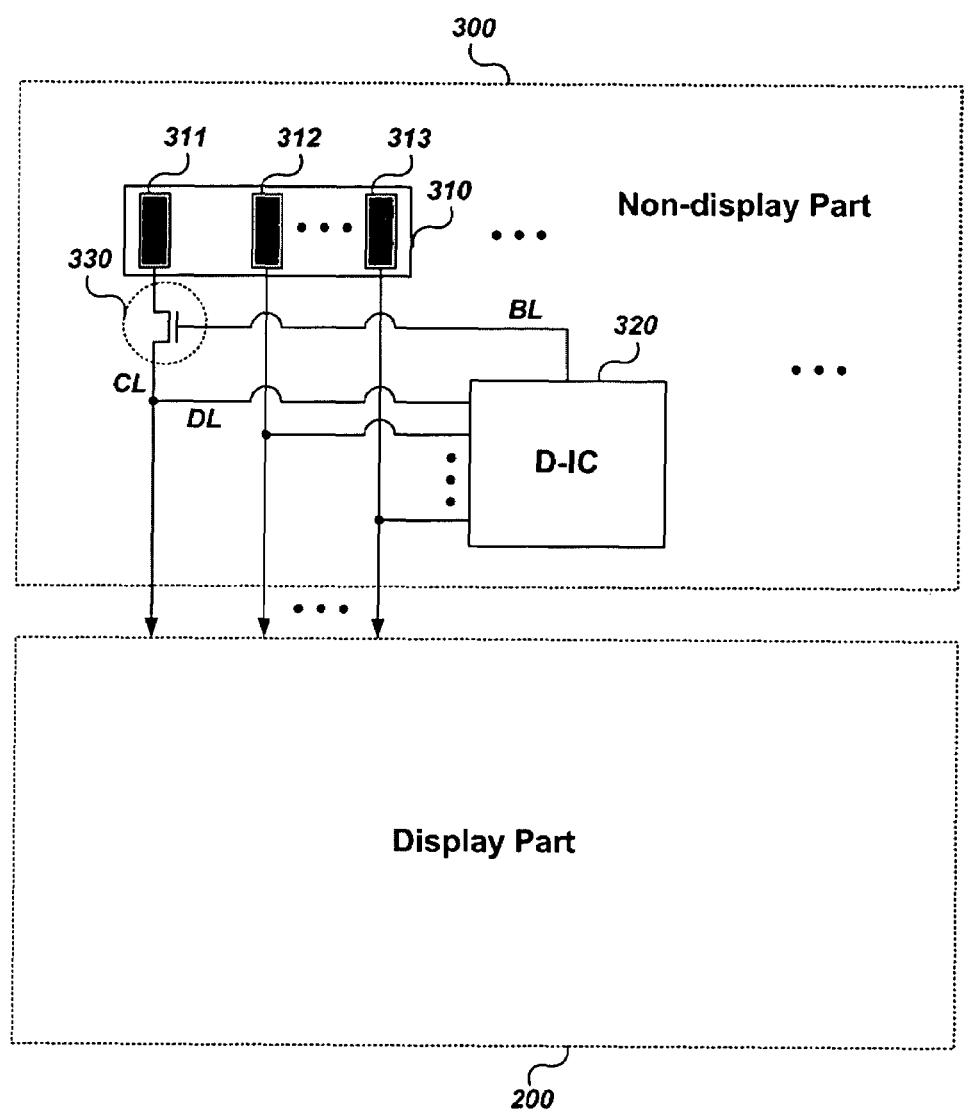
FIG. 3 is a view schematically showing a liquid crystal display panel having a test pad part in accordance with an embodiment of the present invention.

FIG. 3 is a schematic of a liquid crystal display in accordance with an embodiment of the present invention.

Referring to FIG. 3, the liquid crystal display panel in accordance with this embodiment of the present invention comprises: a pixel part having a plurality of pixels arranged in a matrix at intersection areas of a plurality of gate lines and a plurality of data lines (not illustrated); a gate pad part having a plurality of gate pads, each of the gate pads connected with the corresponding gate lines to deliver a gate signal; a data pad part having a plurality of data pads, each of the data pads connected with the corresponding data lines to deliver a data signal (not illustrated); a test pad part 310 having at least one or more on-off pads 311, 312 and 313 delivering a test signal to the gate lines or the data lines; and a switching device 330 for cutting off the gate signal and/or the data signal so as not to be provided to the on-off pads 311, 312 and 313 upon driving the liquid crystal display panel. In the liquid crystal display panel of a COG type, a display part 200 comprises a pixel part, a gate pad part and a data pad part, and a non-display part comprises a test pad part 310, a driving circuit 320 and a switching device 330.

A test pad part 310 may include a plurality of on-off pads 311, 312 and 313 for applying a test signal or equivalent and may be formed at the non-display part 300 of the liquid crystal display panel 300.

The test pad part 310 may be either a gate test pad part or a data test pad part. If the test pad part 310 is a gate test pad part, the driving circuit 320 is a gate driving circuit and if the test pad part 310 is a data test part, the driving circuit 320 is a data driving circuit. For convenience, the description provided assumes that the driving circuit 310 is a data driving circuit and the test pad part 310 is a data test pad part.

Further, the test pad part 310 and the driving circuit 320 can be formed on at least one non-display part 300. That is, a plurality of data driving circuits 320 for supplying a data signal or the like to the data lines of the thin film transistor substrate may be provided. A plurality of data test pad parts 310 may be provided for each of the data driving circuits 320.

As shown in FIG. 3, the data driving circuit 320 and the data test pad part 310 are electrically connected by a signal line or equivalent. Substantially, the plurality of on-off pads 311, 312 and 313 formed in the data test pad part 310 are connected to RGB data lines of the data driving circuit 320.

Therefore, in accordance with the embodiment of the present invention, in the case of driving the liquid crystal display panel where the on-off pads 311, 312 and 313 in the data test pad part 310 are not operated but the data driving circuit 320 is operated, a switching unit 330 is provided between the data driving circuit 320 and the data test pad part 310 in order to prevent electrolytic corrosion or other corrosion of the on-off pads 311, 312 and 313 in the data test pad part 310 that may occur as a signal applied from the data driving circuit 320 is introduced into the data test pad part 310.

The switching unit 330 is a switch, which may be a thin film transistor. The gate of the thin film transistor may be connected to the data driving circuit 320, the source/drain thereof may be connected to the on-off pads 311, 312, 313 and the drain/source thereof may be connected to a test line CL. Further, the gate of the thin film transistor and the source/data lines of the on-off pad 311 may be short-circuited, thus forming a diode junction.

The thin film transistor may be formed simultaneously when a TFT (not shown) for pixel driving is formed upon forming a thin film transistor substrate. In this case, the thin film transistor for pixel driving is formed on the display part 200, while the thin film transistor connected to the on-off pad 311 is formed on the non-display part 300.

Because the switching unit 330 serves to prevent a data signal DL of the data driving circuit 320 from being electrically connected to the on-off pad 311, a diode or equivalent can be used as well as the above-described thin film transistor.

Subsequently, in case of a data on/off test or equivalent using the data test pad part 310, the switching unit 330 is opened, and in other cases including driving of the liquid crystal display panel, the switching unit 330 is closed to float the data test pad part 310 so that any unintended signal cannot be applied to the data test pad part 310.

In an embodiment of the present invention, at the time of a data on/off test, a switch-on signal BL is applied from the data driving circuit 320 to be connected to the data test line CL, and at the time of driving the liquid crystal display panel, a switch-off signal is applied to prevent the data signal DL from being electrically connected to the on-off pad 311.

Figure 4:
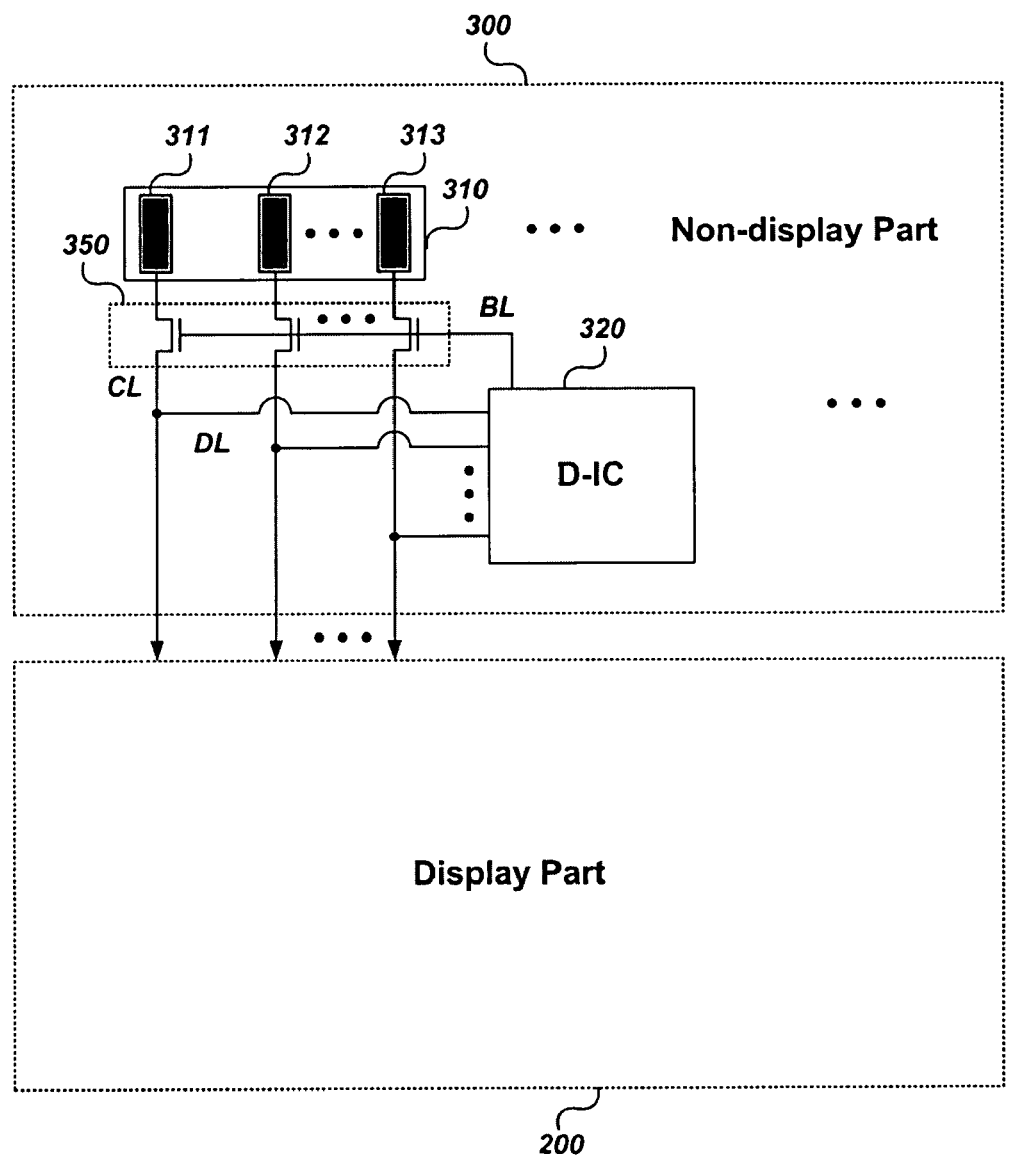
FIG. 4 is a view schematically showing a liquid crystal display panel having a test pad part in accordance with another embodiment of the present invention.
Figure 5:
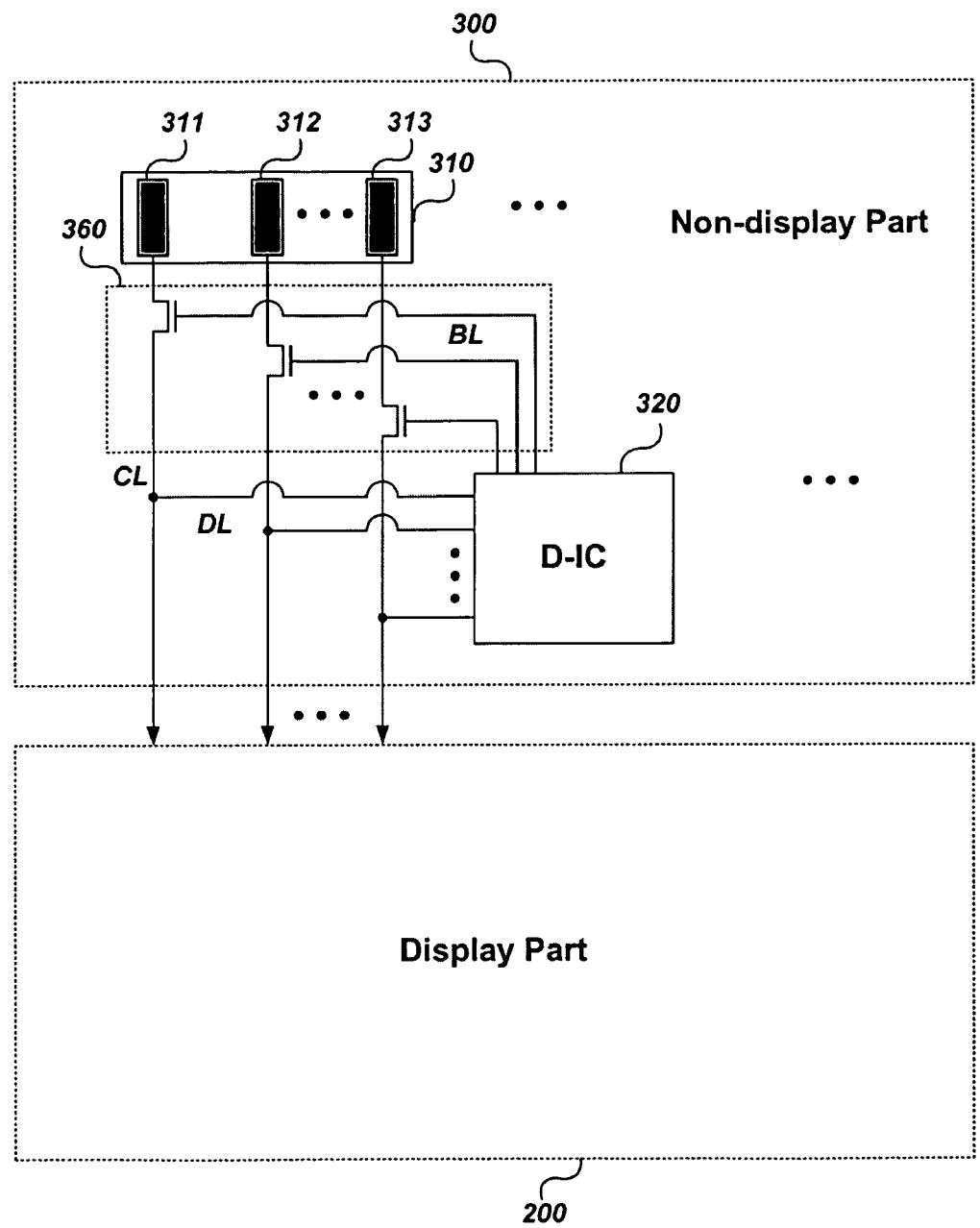
FIG. 5 is a view schematically showing a liquid crystal display panel having a test pad part in accordance with another embodiment of the present invention.

FIG. 4 is a view schematically showing a liquid crystal display panel having a test pad part in accordance with another embodiment of the present invention. FIG. 5 is a view schematically showing a liquid crystal display panel having a test pad part in accordance with another embodiment of the present invention.

The above-described embodiment of the present invention shows a situation where only a connecting line of part of the data test pad part 310 having a high frequency of rust occurrence is provided with the switching unit 330 (refer to FIG. 3), and the other embodiments of the present invention show a situation where switching units 350 and 360 are provided the entire part of the data test pad part 310, respectively (refer to FIGS. 4 and 5).

In other words, in the embodiment of the present invention, the on/off control of the switching unit 330 can be performed by a separate control signal or equivalent provided from the data driving circuit 320. FIG. 4 shows a situation where a plurality of switches 350 are batch-controlled by a single control signal, and FIG. 5 shows a situation where a plurality of switches 360 are controlled by corresponding control signals.

A three-stage switching device such as a thin film transistor can be used as the switching unit 330.

Figure 6:
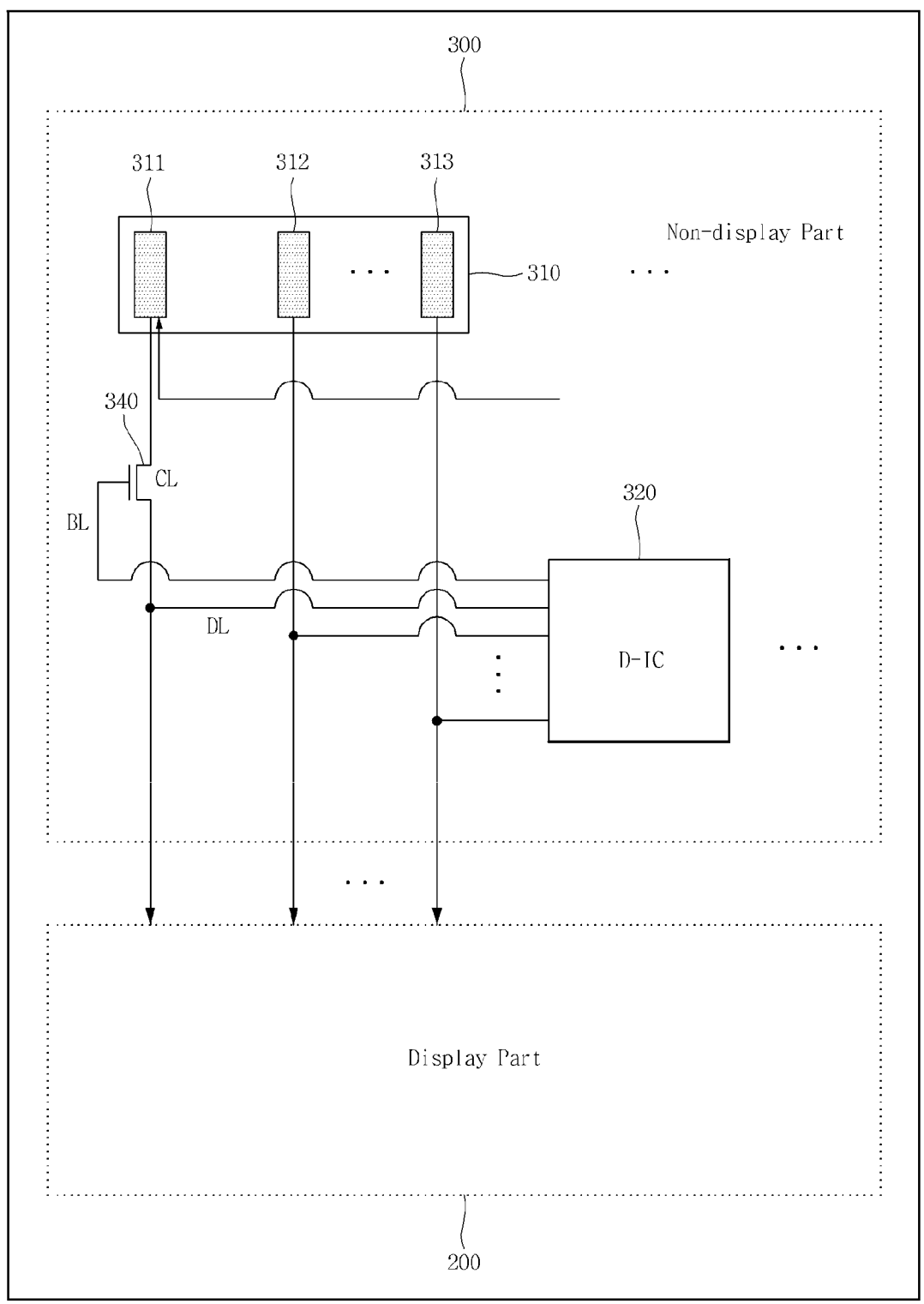
FIG. 6 is a view schematically showing a liquid crystal display panel having a test pad part in accordance with another embodiment of the present invention.
Figure 7:
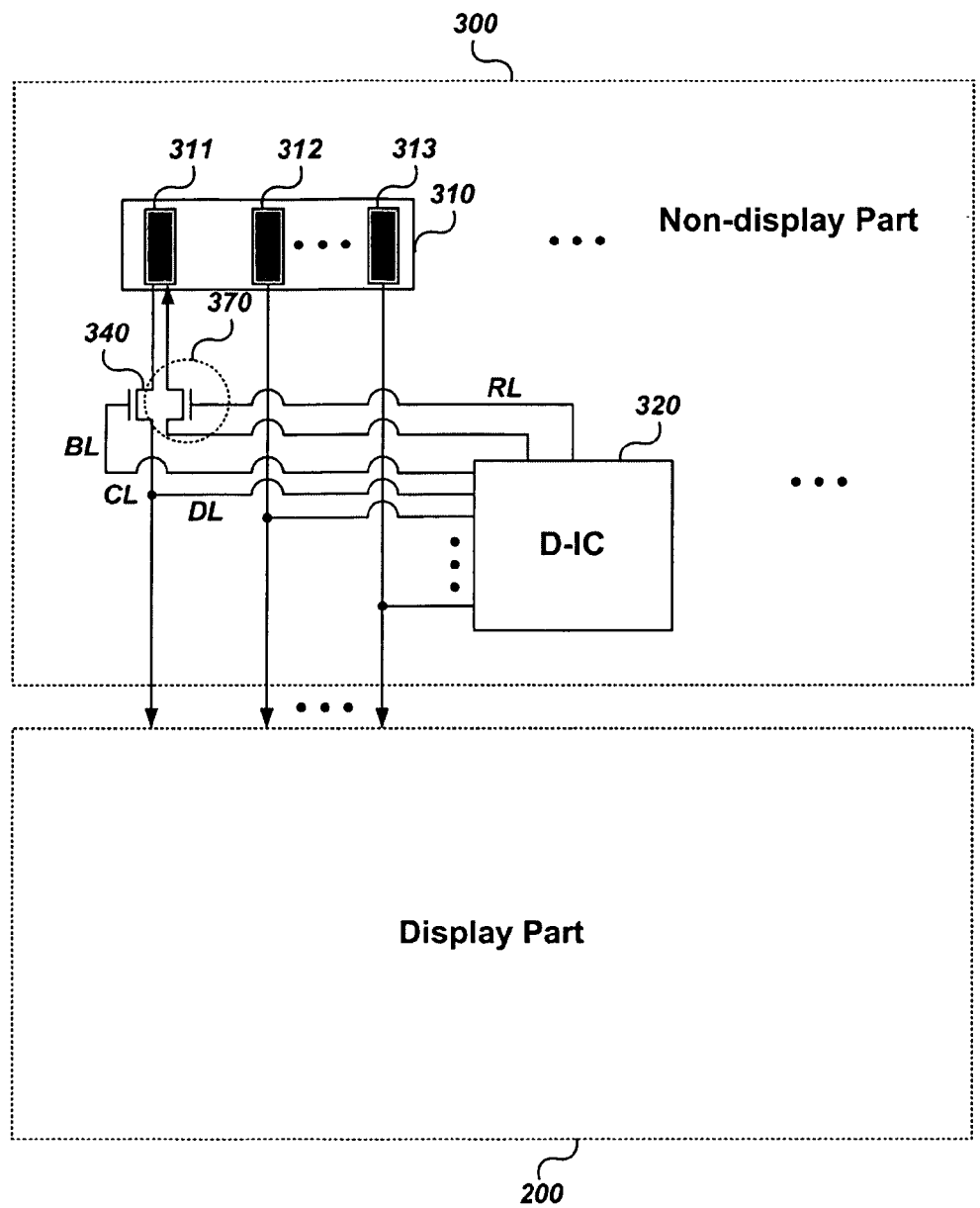
FIG. 7 is a view schematically showing a liquid crystal display panel having a test pad part in accordance with another embodiment of the present invention.

FIG. 6 is a view schematically showing a liquid crystal display panel having a test pad part in accordance with another embodiment of the present invention. FIG. 7 is a view schematically showing a liquid crystal display panel having a test pad part in accordance with another embodiment of the present invention.

FIG. 6 is a view schematically showing a liquid crystal display panel having a test pad part in accordance with another embodiment of the present invention, by which it can be seen that the data driving circuit 320 and the data test pad part 310 are electrically connected by a signal line or equivalent.

In the data driving circuit 320 provided at the liquid crystal display panel in accordance with the embodiment of the present invention as shown in FIG. 6, where only the data driving circuit 320 is operated when driving the liquid crystal display panel, a separate signal RL from the data driving circuit 320 is applied to the on-off pads 311, 312 and 313 in the data test pad part 310, thereby preventing electrolytic corrosion or other corrosion of the on-off pads 311, 312 and 313 in the data test pad part 310.

That is, the occurrence of electrolytic corrosion or other corrosion of the on-off pads 311, 312 and 313 in the data test pad part 310 is caused by a negative voltage relative to the neighboring on-off pads. Thus, by applying a separate compensation signal to the on-off pads 311, 312 and 313 in the data test pad part 310, electrolytic corrosion or other corrosion of the data test pad part 310 can be prevented. Here, the neighboring pads indicate the other on-off pads to which no voltage is applied.

Such a compensation signal may include a ground (GND) voltage, a positive voltage capable of compensating a negative voltage, or a voltage having the same magnitude applied to the entire on-off pads 311, 312 and 313 but is not limited thereto.

The compensation signal can be applied only to part of the data test pad part 310 having a high frequency of electrolytic corrosion or other corrosion or to the entire part of the data test pad part 310.

As shown in FIG. 7, the data driving circuit 320 can be configured such that such a compensation signal can be applied to or cut off from the on-off pads 311, 312 and 313 in the data test pad part 310 through a separately provided switch 370. At this time, a switch control signal for determining whether to apply or cut off the compensation signal can be provided from the data driving circuit 320. As the switch 370, a thin film transistor or equivalent which is a three-stage switching device, may be used.

Other than the compensation signal, the switching unit 330, as described in FIG. 3, capable of floating the on-off pads 311, 312 and 313 in the data test pad part 310 can be used together. Further, as described in FIGS. 4 and 5, the switch 340 and 350 can be provided at a part or the entire part of the on-off pads 311, 312 and 313 in the data test pad part 310, controlled by the data driving circuit 320, and constructed of a thin film transistor or equivalent.

So far, the embodiments of the present invention described through FIGS. 3 to 7 have been described only by way of example of a data test pad and a data driving circuit. However, it is obvious that such construction is also be applicable to a gate test pad, a gate driving circuit, etc.

According to the above-described liquid crystal display panel and liquid crystal display apparatus having the same in accordance with embodiments of the present invention, it is possible to prevent electrolytic corrosion or other corrosion of the test pads which have occurred by introduction of gate signals and/or data signals without having an additional complicated circuit or equivalent.

Furthermore, such a structure can be applied to all flat-panel displays (such as an AMOLED) having test pads as well as liquid crystal display apparatuses.

Furthermore, although the embodiments of the present invention have been described with respect to construction and operation of a liquid crystal display apparatus by way of example, it is apparent to those skilled in the art that these embodiments of the present invention are applicable to all flat-panel displays (such as an AMOLED) having on-off pads as well as liquid crystal display apparatuses.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display panel, comprising:
   a pixel part having a plurality of pixels arranged in a matrix at intersections of a plurality of gate lines and a plurality of data lines;
   a gate pad part having a plurality of gate pads, each of the gate pads connected with the corresponding gate lines to deliver a gate signal;
   a data pad part having a plurality of data pads, each of the data pads connected with the corresponding data lines to deliver a data signal;
   a test pad part having at least one or more on-off pads delivering a test signal to the gate lines or the data lines; and
   a switching device for cutting off the gate signal and/or the data signal so as not to be provided to the on-off pads upon driving the liquid crystal display panel.

2. The liquid crystal display panel of claim 1, wherein the switching device is formed on a test line connected to the at least one or more on-off pads.

3. The liquid crystal display panel of claim 2, wherein the switching of the switching device connected to the at least one or more on-off pads is controlled by a single control signal.

4. The liquid crystal display panel of claim 2, wherein the switching of the switching device connected to the at least one or more on-off pads is controlled by corresponding control signals.

5. The liquid crystal display panel of claim 1, wherein the switching device allows a gate test signal or a data test signal input through the on-off pads to pass through at the time of an on/off test of the liquid crystal display panel.

6. The liquid crystal display panel of claim 1, wherein the switching device is a thin film transistor.

7. The liquid crystal display panel of claim 1, wherein the test pad part comprises:
   a gate test pad part for delivering a gate test signal to the gate lines and a data test pad part for delivering a data test signal to the data lines, and the switching device is formed between gate and data driving circuits for providing a gate signal and a data signal to the corresponding gate and data pad parts and the gate and data test pad parts, respectively.

8. The liquid crystal display panel of claim 7, wherein the switching device is controlled by a control signal applied from the data driving circuit.

9. A liquid crystal display apparatus, comprising:

a source driver for applying a data signal to data lines;

a gate driver for applying a gate signal to gate lines; and a liquid crystal display panel for displaying data through unit pixels in response to the gate signal and the data signal, wherein the liquid crystal display panel further comprises:

a pixel part having a plurality of pixels arranged in a matrix at intersections of a plurality of gate lines and a plurality of data lines;

a gate pad part having a plurality of gate pads, each of the gate pads connected with the corresponding gate lines to deliver a gate signal;

a data pad part having a plurality of data pads, each of the data pads connected with the corresponding data lines to deliver a data signal;

a test pad part having at least one or more on-off pads delivering a test signal to the gate lines or the data lines; and a switching device for cutting off the gate signal and/or the data signal so as not to be provided to the on-off pads upon driving the liquid crystal display panel.

10. The liquid crystal display apparatus of claim 9, wherein the switching device is formed on a test line connected to the at least one or more on-off pads.

11. The liquid crystal display apparatus of claim 10, wherein the switching of the switching device connected to the at least one or more on-off pads is controlled by a single control signal.

12. The liquid crystal display apparatus of claim 10, wherein the switching of the switching device connected to the at least one or more on-off pads is controlled by corresponding control signals.

13. The liquid crystal display apparatus of claim 9, wherein the switching device allows a gate test signal or a data test signal input through the on-off pads to pass through at the time of an on/off test of the liquid crystal display panel.

14. The liquid crystal display panel of claim 9, wherein the switching device is a thin film transistor.

* * * * *